United States Patent

Makowski

[11] Patent Number: 6,026,972
[45] Date of Patent: Feb. 22, 2000

[54] DEBRIS RECEPTACLE FOR ATTACHMENT TO A CUTTING BOARD

[76] Inventor: Gregory L. Makowski, 302 Laurel Way #2, Mill Valley, Calif. 94941

[21] Appl. No.: 09/056,168

[22] Filed: Apr. 7, 1998

[51] Int. Cl.$^7$ .................................................. B65D 83/00
[52] U.S. Cl. .................................. 220/495.08; 220/908.3; 220/910
[58] Field of Search ........................ 220/495.08, 495.11, 220/908.3, 908.1, 910

[56] References Cited

U.S. PATENT DOCUMENTS

| | | | |
|---|---|---|---|
| 838,424 | 11/1906 | Kohn | 220/910 |
| 1,043,238 | 11/1912 | Knowlton et al. | 220/910 |
| 1,693,268 | 11/1928 | Burger | 220/910 |
| 2,363,699 | 11/1944 | Smith | 220/495.08 |
| 4,483,440 | 11/1984 | Ware | 220/495.08 |

*Primary Examiner*—Joseph M. Moy

[57] ABSTRACT

A debris receptacle for attachment to a cutting board comprising: a bag holding frame, a U shaped backstop and attached legs, and a leg holding plate. The bag holding frame being rectangular and made of rigid material such as molded plastic or metal and capable of retaining a standard plastic bag of the sort used when purchasing fruits and vegetables at a food market. The U shaped backstop being made of rigid material such as plastic or metal and having an internal ledge for supporting the bag holding frame and also having parallel extension legs extending horizontally from the ends of each side of the U shaped backstop. The leg holding plate being fixidly attached to the underside of a standard cutting board. The leg holding plate having a pair of flanges located at each parallel edge for releasably retaining the parallel extension legs of the U shaped backstop.

3 Claims, 4 Drawing Sheets

DEBRIS RECEPTACLE FOR ATTACHMENT TO A CUTTING BOARD

BACKGROUND OF THE INVENTION

This invention relates generally to the field of trash receptacles, and more particularly to a debris receptacle for attachment to a cutting board.

Cutting boards used as a surface for cutting fruits, vegetables, meats, fish and the like have been in existence for many years. These cutting boards are usually made of wood but sometimes made of plastic. In the normal use of such a cutting board it is common to cut and item and create a usable or edible portion and an unusable portion which has to be discarded. Currently the unusable portion is pushed to one side while the user continues to cut the item into usable and unusable portions.

With the current method the user has to periodically sweep the unusable portion of the food being prepared into a receptacle, either a trash container or a sink with a disposal unit so that they can reclaim enough surface area on the cutting board to continue with their cutting activity.

The act of removing excess debris from a cutting board is time consuming and potentially messy since the user must scoop up the debris and transport the debris from the cutting surface to a trash or the like. There is therefore, a need for a debris holding device which is conveniently located in close relation to a cutting board so that a user can quickly sweep the debris into a debris holding receptacle.

SUMMARY OF THE INVENTION

The primary object of the invention is to provide a better debris catching device that attaches easily to any cutting board.

Another object of the invention is to provide a debris catching device that incorporates standard plastic bags for catching debris.

Another object of the invention is To provide a debris catching device that is inexpensive to manufacture.

Other objects and advantages of the present invention will become apparent from the following descriptions, taken in connection with the accompanying drawings, wherein, by way of illustration and example, an embodiment of the present invention is disclosed.

A debris receptacle for attachment to a cutting board comprising: a bag holding frame, a U shaped backstop and bag frame retainer, a pair of holding legs, and a leg holding plate. The bag holding frame is rectangular and made of rigid material such as molded plastic or metal and capable of retaining a standard plastic bag of the sort used when purchasing fruits and vegetables at a food market. The U shaped backstop is made of rigid material such as plastic or metal and has an internal ledge for supporting the bag holding frame and also has parallel extension legs extending horizontally from the ends of each side of the U shaped backstop. The leg holding plate is fix idly attached to the underside of a standard cutting board. The leg holding plate has a pair of flanges located at each parallel edge for entrapping the parallel extension legs. In this way a person can take a standard plastic bag, wrap the top edge over the bag holding frame and place the bag holding frame onto the ledge located inside the U shaped backstop. The person then slides the legs, which are integral to the U shaped backstop, into the space created between the underside of the cutting board and the flange of the leg holding plate which has been affixed to the underside of the cutting board. The result is that a debris catching and retaining member is conveniently affixed to the side of a cutting board so that as a person is cutting food he or she can quickly and neatly slide debris into a receptacle. When the cutting activity is complete the person can then slide the U shaped backstop away from the cutting board, remove the bag and bag holding frame and throw the debris filled bag into a larger trash or into a sink disposall or the like. The debris holding device is easy to clean and can be easily stored and reused.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
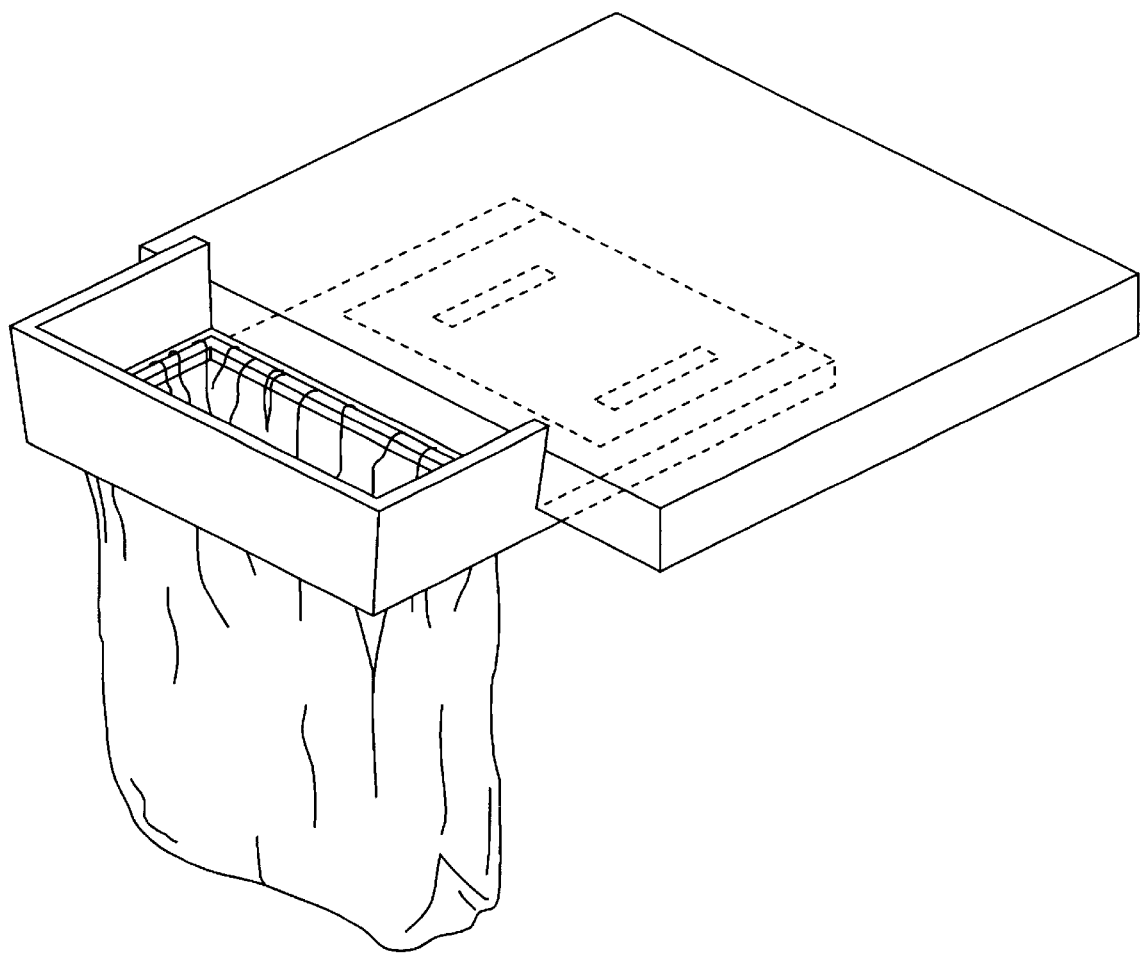
FIG. 1 is a perspective view of the debris holding device of the present invention.
Figure 2:
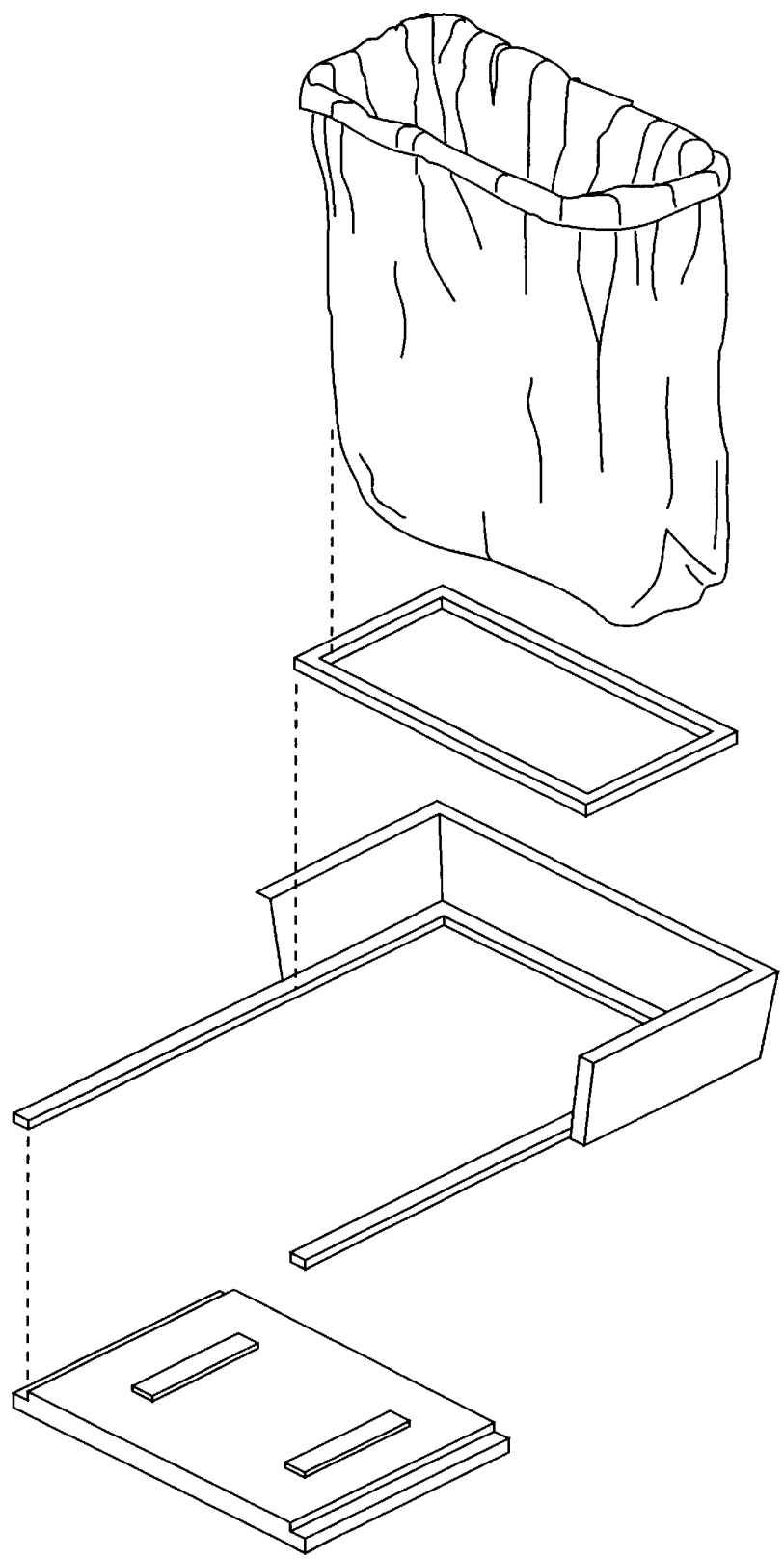
FIG. 2 is an exploded view of the debris holding device of the present invention.
Figure 3:
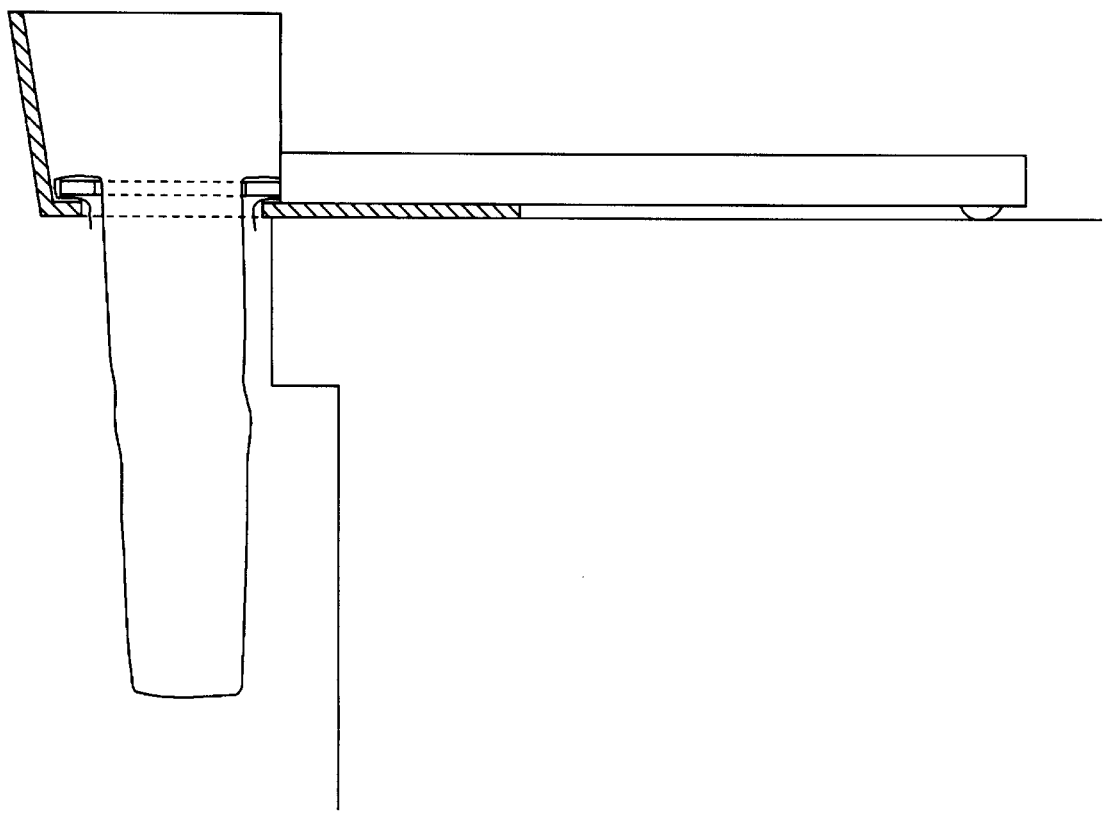
FIG. 3 is a side section view of the debris holding device of the present invention.
Figure 4:
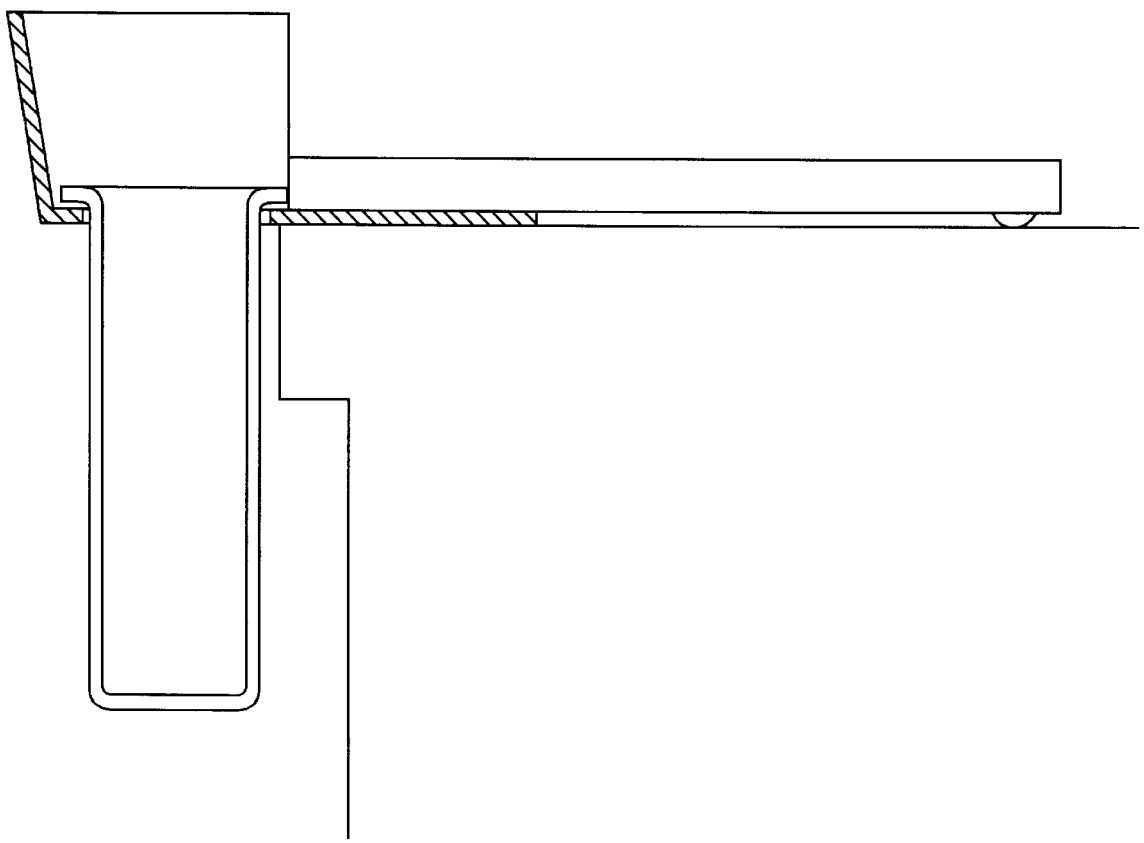
FIG. 4 is a side section view of the debris holding device of the present invention showing an alternate debris holding container.

Now referring to FIG. 1 we see a perspective view of the debris holding of the present invention. Standard cutting board 14 is located on a typical counter top 2. The integral legs 16 of U shaped backstop 6 are held in place by the parallel flanges 20 of leg retaining plate 10 which is affixed to the underside of the cutting board by double sided tape 12 or the like. Rectangular bag holding frame 8 is entrapping a standard plastic bag 4 such as the type used for holding and transporting fruits and vegetables in a typical food store. In this way a person can cut food on cutting board 14 and quickly and neatly sweep the debris into bag 4. Backstop 6 keeps any excess debris from accidentally falling on the floor. FIG. 2 is an exploded view of the present invention. Bag 4 is inserted into frame 8 and the top edge 26 of the bag is folded over the top edge of frame 8. Bag 4 and frame 8 are then inserted into U shaped backstop 6 and rest on lip 24. Leg retaining plate 10 is attached to a standard cutting board by double sided tape 12. Parallel legs 16 are able top slide into the space created by the ledge 20 and the underside of the cutting board. The U shaped backstop and associated bag and bag holding frame can then be slid out to remove and replace the debris bag. FIG. 3 shows a side section view of the present invention in conjunction with cutting board. Folded bag top 26 is retained by being trapped between ledge 24 on one side and leg holding plate 16 on the other side. One or more spacer type feet 34 can be supplied with the present invention to help keep the cutting board horizontal. FIG. 4 shows a side section of the present invention with an alternate embodiment where a molded plastic container 60 takes the place of the previously mentioned plastic bag. The container 60 has a top lip 61 which rests on ledge 24.

In this way, using the present invention in conjunction with a cutting board, a person can easily, quickly and neatly sweep debris from the cutting board into a bag or container which can then be removed and replaced as needed.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. Debris receptacle for attachment to a cutting board comprising:

a bag holding frame, a U shaped backstop and bag frame retainer;

a pair of holding legs, and a leg holding plate;

said bag holding frame being rectangular and made of rigid material such as molded plastic or metal and capable of retaining a standard plastic bag of the sort used when purchasing fruits and vegetables at a food market;

said U shaped backstop being made of rigid material such as plastic or metal and having an internal ledge for supporting said bag holding frame and also having parallel extension legs extending horizontally from the ends of each side of said U shaped backstop;

said leg holding plate being fixidly attached to the underside of a standard cutting board, said leg holding having a pair of flanges located at each parallel edge for entrapping and making slidably removable and replacable said parallel extension legs.

2. A debris receptacle as claimed in claim 1 wherein a spacer foot is provided to attach to the underside of said cutting board to makesaid cutting board horizontal.

3. A debris recepticle as claimed in claim 1 wherein said plastic bag can be replaced by a molded plastic container having a top lip capable of resting on said ledge of said inner backstop wall.

* * * * *